PHOTOELECTRICALLY CONTROLLED SAWTOOTH WAVE OSCILLATOR

Filed Nov. 4, 1963

INVENTOR.
GERARDUS J. DEELMAN
HANS BRONKHORST
BY
Frank R. Trifari
AGENT

United States Patent Office 3,268,733

Patented August 23, 1966

3,268,733

PHOTOELECTRICALLY CONTROLLED SAW-TOOTH WAVE OSCILLATOR

Gerardus Jacobus Deelman and Hans Bronkhorst, both of Emmasingel, Eindhoven, Netherlands, assignors to North American Philips Company, Inc., New York, N.Y., a corporation of Delaware Filed Nov. 4, 1963, Ser. No. 321,236
Claims priority, application Netherlands, Nov. 13, 1962, 285,461
7 Claims. (Cl. 250—217)

This invention relates generally to electro-optical devices and more particularly to an oscillator unit with a photoresistor. The unit comprises the parallel arrangement of an element which is provided with at least two electrodes and the said photoresistor, a radiation to be produced by at least part of the said element irradiating the photoresistor, and which parallel arrangement, in series with an ohmic resistor, is connected to the terminals of a direct voltage source.

Oscillators of this type are known from U.S. Patent 2,898,556. In this patent, the element is a so-called electroluminescent element. As appears from said patent specification, an electroluminescent element is inert, that is to say, the intensity of the light irradiated by this element gradually increases and then gradually decreases in an oscillator circuit as described above, the variation of the voltage across the electroluminescent element being also determined by the variation of the resistance value of the photoresistor.

If such an oscillator is to be constructed as a relaxation oscillator for producing a sawtooth voltage, an electroluminescent element is unsuitable for said purpose owing to its inertia. In addition, the possibility is not given in the said patent specification of synchronizing the oscillator. Synchronizing a relaxation oscillator for producing a sawtooth voltage which can be used in television receivers and in oscillographs is strictly necessary in many cases.

It therefore is an object of the invention to provide an oscillator capable of producing sawtooth voltages. The oscillator according to the invention is characterized in that the element is constructed so that breakdown occurs when the voltage between the two said electrodes exceeds the breakdown voltage, the luminescent part of the element being caused to light up substantially entirely and substantially immediately, and extinguishing when the voltage between the said two electrodes falls below the extinguishing voltage, the luminescent part of the element being extinguished substantially entirely and substantially immediately. Means are provided for supplying synchronization pulses to either the element or the photoresistor.

Figure 1:
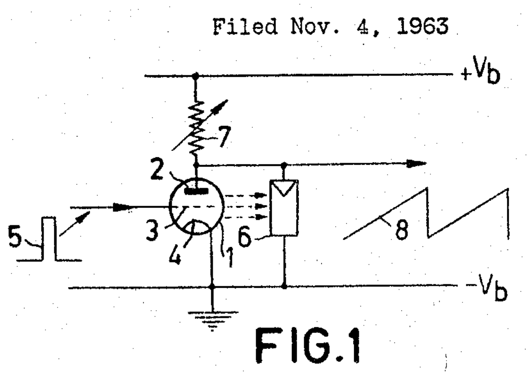
Figure 2:
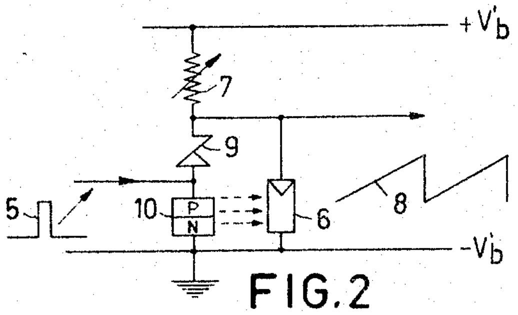
Figure 3:
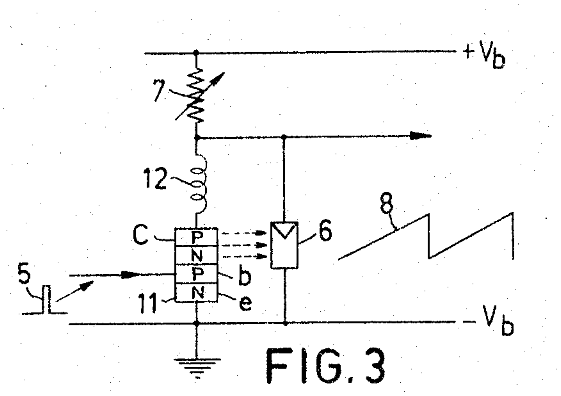
Figure 4:
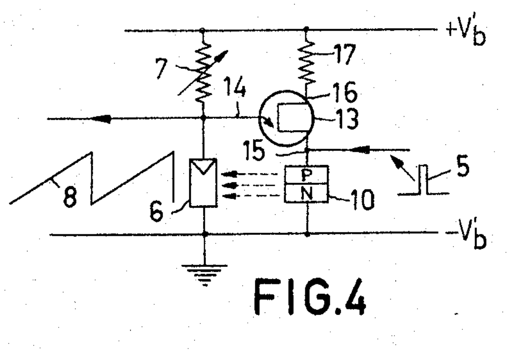

In order that the invention may readily be carried into effect, a few possible embodiments of oscillators according to the invention will now be described more fully, by way of example, with reference to the accompanying figures, in which:

FIG. 1 is a first embodiment in which the luminescent element is a three-electrode tube which is filled with a rare gas, FIG. 2 is a second embodiment in which the luminescent element is constructed as a source of radiation of the semi-conductor type in series with a Zener diode which substantially determines the voltage at which the series arrangement of Zener diode and semi-conductor breaks down, FIG. 3 shows a third embodiment in which the element is a thyristor, FIG. 4 shows a fourth embodiment in which the luminescent element is constructed as a source of radiation of the semi-conductor type in series with a unijunction transistor which determines the voltage at which the series arrangement of unijunction transistor and semi-conductor breaks down.

In FIG. 1, reference numeral 1 designates a discharge tube with three electrodes, namely an anode 2, a control grid 3 and a cathode 4. This tube is filled with a rare gas, for example neon or argon, which, when the voltage applied between the anode 2 and the cathode 4 exceeds the so-called breakdown voltage, breaks down, thereby emitting light. As is known, this breakdown may be induced if the voltage between the anode 2 and the cathode 4 has not yet reached the breakdown voltage, but a positive pulse 5 is supplied to the control grid 3 which may introduce the breakdown. Parallel to the tube 1, a photoresistor 6 is connected. The material of this photoresistor may be cadmium sulphide or cadmium selenide. In case of cadmium sulphide, the recombination time for electrons in the conduction band back to the valence band is larger than in the case of cadmium selenide being used.

As will be explained below, this recombination time also determines the period of the stroke of the sawtooth voltage to be produced. From this it follows that the choice of cadmium sulphide or cadmium selenide plus the choice of the intensity of the light pulse which impinges upon the photoresistor also determine the period of the stroke of the sawtooth voltage to be produced. In addition, this recombination time depends upon the intensity of the light pulse which impinges upon the photoresistor. The larger the intensity of the light pulse, the quicker the electrons recombine.

How a sawtooth voltage can be produced with a circuit as shown in FIG. 1 may be explained as follows.

The parallel circuit of the tube 1 and the photoresistor 6 is connected at an intermediate point through a series resistor 7 to the terminals of a supply voltage source which supplies a supply voltage of $V_b$ volts. The anode 2 must be connected on the side of the operating or positive potential terminal and the cathode 4 on the side of the reference or negative potential terminal of said supply voltage source. Now let it be assumed that the supply voltage $V_b$ supplied by the supply voltage source is considerably larger than the breakdown voltage of the tube 1. For example, $V_b$ is 200 v. while the breakdown voltage of the tube 1 is approximately 100 v.

Starting from a condition in which the tube 1 is in the broken-down condition, the light emitted by the tube 1 in this condition is directed towards the photoresistor 6 which will considerably decrease in resistance value. As a result of this, the current through the resistor 7 increases, which now flows both through the tube 1 and through the resistor 6 the resistance value of which is strongly decreased. As a result of this, the voltage drop across the resistor 7 increases considerably, so that the voltage between the anode 2 and the cathode 4 strongly decreases below the extinguishing voltage of the tube 1. As a result of this, the tube 1 extinguishes substantially immediately and consequently also the irradiation for the resistor 6 is omitted. However, extinguishing of the tube 1 will not cause the resistance value of 6 to increase immediately to that resistance value which the resistor 6 would have if it were not all illuminated, that is to say its so-called dark resistance. As a matter of fact, the increase of the resistance value of 6 is determined by its recombination time. During the time that the resistance 6 is illuminated with light from the tube 1, electrons were transported from the valence band to the conduction band and as soon as the light is removed, these electrons want to recombine again from the conduction band to the valence band. However, the time to compel electrons to pass from the valence band with light quanta to the conduction band is many times smaller than the recombination time. Therefore, it will take ample time before the resistance value of 6 has increased to such an extent that the current then flowing through the resistor 7 causes such a voltage drop across this resistor that the voltage between the anode 2 and the cathode 4 again increases above the breakdown voltage of the tube 1. If this is the case, the tube 1 again ignites, again emits light which considerably decreases again the resistance value of the resistor 6 as a result of which again the voltage between the anode 2 and the cathode 4 falls below the extinguishing voltage, the tube 1 extinguishes and the cycle described just now is repeated.

It was assumed above that the stroke period of the sawtooth voltage 8 produced is also determined by the recombination time of the photoresistor 6. However, it will be clear that this stroke period is further determined by the value of the supply voltage $V_b$ and the resistance value of the resistor 7. For, if the resistor 7 is constructed as a variable resistor, another value of the resistor 6 will be associated with another value of the resistor 7 which is decisive of the breakdown voltage to be considered as a fixed value. Let it be assumed, for example, that the resistor 7 is decreased, the resistance value of 6 must also assume a smaller value than in case of a larger value of the resistor 7. However, in order to rise from a minimum resistance value which is obtained when the resistor 6 is irradiated from the tube 1 by a maximum quantity of light, to a smaller resistance value, less time is required than when the resistor 6 would have to rise to a larger resistance value. Decreasing the resistor 7 consequently results in a decrease of the stroke period of the sawtooth voltage 8.

In a corresponding manner, it may be reasoned that decreasing the supply voltage $V_b$ results in increasing the stroke period.

Since in such an oscillator, the parasitic capacities remain restricted to those between the electrodes of the tube 1 and of the resistor 6 and the wiring, the fly-back period of the produced sawtooth voltage 8 is very short and further depends only upon the deionization period of the rare gas in the tube 1 and on the speed at which the charge carriers in the semi-conductor material of the resistor 6 can be brought from the valence band to the conduction band.

From this it follows that the fly-back period of the produced sawtooth voltage is substantially constant and is substantially not determined by the value of the resistor 7 and of the supply voltage $V_b$. Therefore, it may be assumed that the frequency of the produced saw-tooth voltage can be varied by varying the supply voltage $V_b$ or by varying the resistor 7.

As as example it may be stated that in a circuit arrangement shown in FIG. 1, in which the resistor 6 was of the type ORP 90 while the tube 1 was filled with neon gas, sawtooth voltages could be produced with recurrence frequencies between ¼ and 80 c./s., the fly-back period being in the order of magnitude of 5 microseconds. Exactly this short fly-back period renders the circuit arrangement with a photoresistor very attractive.

As already explained in the introduction, it is desirable that the oscillator can be synchronized. This is effected by means of the pulses 5 which are supplied to the control grid 3. For example, the oscillator shown in FIG. 1 may form part of a vertical deflection circuit in a television receiver. In that case, the pulses 5 are the frame synchronization pulses which are derived from the television signal received and the produced sawtooth voltage 8 may serve for controlling the vertical final stage.

In FIG. 2, in which corresponding parts are numbered as much as possible in accordance with FIG. 1, the tube 1 is replaced by the series arrangement of a Zener diode 9 and a source of radiation 10.

The source of radiation 10 is of the semi-conductor type, the semi-conductor material of which has a larger distance between the conduction band and the valence band such that recombination of the charge carriers from the conduction band to the valence band takes place while emitting a considerable quantity of light quanta. Therefore, when a current flows through this semi-conductor, light will be emitted by the source of radiation 10. A very suitable semiconductor material for this purpose is, for example, gallium phosphide which has the above properties. In FIG. 2, it is further stated that the source of radiation 10 is constructed as a p-n junction with diode properties, in which, if required, an intrinsic layer (not shown) may be provided between the p layer and the n layer in order to enhance the quantity of light which can be emitted by the source of radiation 10 when a given current flows through it.

The Zener diode 9 also consists of semi-conductor material and in addition, the elements 9 and 10 must be arranged in series so that the diode 9 is in the cut-off direction for the polarity of the applied supply voltage $V'_b$ and the diode 10 in the pass direction.

The operation of the circuit shown in FIG. 2 is as follows. Let it again be asumed that the source 10 emits radiation. As a result of this, the resistance value of the resistor 6 is decreased. In consequence of this, the voltage across the resistor 6 falls below the breakdown voltage of the Zener diode 9. In this manner, no current can anymore flow through the series arrangement of 9 and 10 and 10 will extinguish. Then again, the recombination phenomenon of the resistor 6 occurs, which remains increasing in resistance value until the breakdown voltage of the Zener diode 9 is reached. The Zener diode breaks down, as a result of which again current starts flowing through the series arrangement of 7, 9 and 10. The source of radiation 10 lights up, decreases the resistance value of the resistor 6, as a result of which 9 is again cut off and therewith the current through 10 fails so that in this case also the cycle is repeated.

In this case also, the frequency of the sawtooth voltage 8 produced can be varied by varying the resistance value of 7 or by varying the supply voltage $V'_b$. Synchronization takes place by supplying synchronization pulses 5 to the source of radiation 10. Since the source of radiation 10 is already ignited at very low voltages, the pulses 5 may have a very small amplitude.

The circuit arrangement shown in FIG. 2 is in addition excellently suitable for use in a deflection circuit in a transistorized television receiver. As a matter of fact, in such a receiver the supply voltage is very low, for example in the order of magnitude of 12 v. In that case, consequently, also the supply voltage $V'_b$ will have to be equal to about 12 v. If a Zener diode 9 with a breakdown voltage of approximately 6 v. is chosen and a current of sufficient intensity is flowing through the source of radiation 10, when the voltage across it is 0.5 v., it will be clear that the said 12 v. of the supply voltage $V'_b$ is sufficient for the circuit shown in FIG. 2 to function. From the above, it will also be clear that the amplitude of the pulses 2 will have to be approximately 0.5 v., which pulses can consequently easily be obtained from a preceding transistor which provides synchronization pulses.

A third embodiment is shown in FIG. 3 in which corresponding parts are again numbered as much as possible in accordance with the two preceding figures. In this figure, the luminescent element consists of a thyristor 11, which is connected in series with an extinguishing coil 12 and which two latter elements are again connected in parallel with the photoresistor 6. In the circuit shown in FIG. 2, the Zener effect was used to determine the breakdown voltage of the diode 9; in the oscillator shown in FIG. 3, the breakdown voltage for the thyristor 11 is determined by the avalanche effect. The thyristor 11 may again be composed of semi-conductor material the band distance of which is so large that recombination takes place while emitting a considerable quantity of light quanta. The thyristor 9 consists of two p-n junctions, the first p-n junction consisting of the emitter *e* and the base *b*, the second p-n junction comprising the collector *c*. The emitter *e* is connected to the one end and the collector *c* through the extinguishing coil 12 to the other end of the resistor 6. The ignition pulses 5 are supplied to the base $b$ of the thyristor 11. The operation of the circuit shown in FIG. 3 is again entirely analogous to that of the two preceding circuit arrangements. If it is assumed again that light from the thyristor 11 impinges upon the photoresistor 6, the value of this resistor is strongly decreased. As a result of this, the voltage across it decreases considerably and the thyristor is extinguished also by means of the extinguishing coil 6. The thyristor can consequently not emit any light any longer, as a result of which the resistance value of 6 increases until the breakdown voltage of the thyristor 11 is again exceeded, the thyristor emits light again, the resistance value of 6 decreases as a result of which 11 is again extinguished etc., etc.

It will be clear that in principle, both p-n junctions of the thyristor 11 can be caused to light up when a current flows through this thyristor. In that case, the thyristor may be composed, for example, entirely by means of gallium phosphide. However, also one of the two p-n junctions could be made of such semi-conductor material, for example silicon, that the radiation is substantially determined by the other p-n junction. Alternatively, an npnp thyristor 11 may be used instead of a pnpn thyristor. In this case, the polarity of the supply voltage $V_b$ and of the pulses 5 must be reversed.

A fourth embodiment is shown in FIG. 4. In this embodiment, the element which determines the breakdown voltage is a so-called unijunction transistor 13 of which the emitter connection 14 is connected to the photoresistor 6 and the first base connection 15 to the source of radiation 10. If the voltage at the emitter 14 becomes somewhat higher than approximately 0.5 $V'_b$, the transistor 13 breaks down, as a result of which a large current tends to flow through the semi-conductor 10 which lights up and by its radiation produced thereby decreases the resistance of the photoresistor 6. As a result of this, the voltage at the emitter 14 falls below 0.5 $V'_b$ volt and the transistor 13 is cut off. As a result of this, the source 10 is extinguished and the radiation for the resistor 6 fails. The resistance value thereof can increase again until the voltage at the emitter 14 arrives above the ignition voltage of the transistor 13, after which the cycle is repeated.

It should be ensured that the initial current which flows through the transistor 13 is not large enough to cause the source of radiation to light up, not even with a small intensity. If the initial resistance value of this transistor (so the condition before the transistor 13 has broken down at a sufficiently large voltage at the emitter 14) is too small, the second base connection 16 may be connected through a further resistor 17 to the positive terminal $+V_b$ of the supply voltage source in order to limit the initial current.

The synchronization pulses 5 may be supplied directly to the source of radiation 10, as was the case in the embodiment shown in FIG. 2.

While in the above description, the emanations from the elements 1, 10 and 11 is assumed to be visible light, it is evident that the emanation may also be infra-red or ultra-violet light. It is only necessary that the resistor 6 is sensitive to the radiation emitted by the sources 1, 10 or 11.

It will also be clear that it is desirable, in view of the short fly-back period of the sawtooth voltage 8, to give the synchronization pulses 5 a very small duration. For, if the duration of these pulses were chosen to be larger than the fly-back period which is determined by the oscillator itself, this fly-back period would be increased unnecessarily. This goes explicitly forward, for example, from the circuit arrangement shown in FIG. 2. For, if in this case the duration of the pulse 5 would be larger than the fly-back period, the pulse 5 impels the source 10 to remain lighting up and therewith the resistance value of 6 remains low so that the lower side of the sawtooth voltage 8 is flattened. The duration of this flattening must be added to the normal fly-back period so that, as it were, an artificial fly-back period is obtained which is determined only by the duration of the synchronization pulses 5.

The synchronization pulses 5 also need not necessarily be supplied to the circuit arrangement in the form of electric pulses. If the synchronization pulses 5 are supplied as light pulses, they may irradiate the photoresistor 6 and consequently decrease the resistance value thereof at the desired instants.

It may also be of importance first to convert the synchronization pulses, received as electric pulses, into light pulses. This latter fact has the advantage than an electric insulation is obtained between that part of a television receiver in which the synchroninzation pulses are separated and the oscillator circuit as a result of which reaction of the oscillator on the synchronization separating circuit becomes impossible.

In that case, the luminescent element, or the combination of the source of radiation and the element determining the breakdown voltage, for example the Zener diode 9 in FIG. 2, may be a second electrode element, since no third electrode is required for supplying the synchronization pulses 5.

What is claimed is:

1. A sawtooth wave oscillator comprising impedance means having at least two electrodes, photosensitive means having at least two electrodes and including the characteristic of decreasing impedance with increasing illumination, an electrically operable bistable luminescent switching means having a control electrode, a common electrode and an output electrode, said electrically operable bistable luminescent switching means optically coupled to said photosensitive means, means connecting one of the electrodes of said impedance means and of said photosensitive means to the output electrode of said luminescent switching means, means applying an operating potential, means connecting the other of the electrodes of said impedance means to said means applying an operating potential, means applying a reference potential, means connecting the other electrode of said photosensitive means and the common electrode of said electrically operable bistable luminescent switching means to said means applying a reference potential, means for applying synchronizing pulses, and means connecting said means for applying synchronizing pulses to the control electrode of said electrically operable bistable luminescent switching means whereby a change of state of said electrically operable bistable luminescent switching means is in synchronism with said pulses.

2. The combination of claim 1 wherein said electrically operable bistable luminescent switching means comprises a discharge tube with a luminescent atmosphere enclosed therein and having an anode forming said output electrode, a cathode forming said common electrode, and a control grid forming said control electrode.

3. The combination of claim 1 wherein said electrically operable bistable luminescent switching means comprises a source of radiation formed by the junction of a p type material and an n type material, a voltage controlled breakdown diode having two electrodes, means coupling the p type material of said junction to one electrode of said diode, thereby forming said control electrode, the other electrode of said diode forming said output electrode, and the n type material of said junction forming said common electrode.

4. The combination of claim 1 wherein said electrically operable bistable luminescent switching means comprises a thyristor having a radiating collector electrode, an emitter electrode, and a base electrode, inductive means connected between said collector electrode and said output electrode, said emitter electrode forming said common electrode, and said base electrode forming said control electrode.

5. The combination of claim 1 wherein said electrically operable bistable luminescent switching means comprises a unijunction transistor having two bases, and an emitter, a source of radiation formed by the junction of a p type material and an n type material, means connecting one of said bases of said unijunction transistor to a source of potential, means connecting the other of said bases of said unijunction transistor to the p type material of said source of radiation, thereby forming the said control electrode, the n type material forming the said common electrode, and the emitter of said unijunction transistor forming the said output electrode.

6. A sawtooth wave oscillator comprising impedance means, photosensitive means having the characteristic of rapidly decreasing impedance in response to the presence of illumination impinging thereon and less rapidly increasing impedance in response to the absence of illumination impinging thereon, a electrically operable bistable switching means, luminescent means optically coupled to said photosensitive means and connected to said switching means, said luminescent means having a condition of maximum conductance and luminescense in one state of said bistable switching means and a condition of minimum conductance and luminescense in the other state of said bistable switching means, the transition between each of said luminescent conditions being relatively instantaneous, an intermediate point, means connecting one end of each of said impedance, said photosensitive means and said electrically operable bistable switching means to said intermediate point, means for applying a potential, and means remote from said intermediate point connecting the other end of each of said impedance means, said photosensitive means and said electrically operable bistable switching means to said means for applying a potential.

7. A sawtooth wave oscillator comprising impedance means, photosensitive means having the characteristic of substantially linearly varying impedance with varying illumination, an electrically operable bistable luminescent switching means optically coupled to said photosensitive means and having a control electrode, an intermediate point, means connecting one end of each of said impedance, said photosensitive means and said electrically operable bistable luminescent switching means to said intermediate point, means for applying a potential, means remote from said intermediate point connecting the other end of each of said impedance means, said photosensitive means and said electrically operable bistable luminescent switching means to said means for applying a potential, said photosensitive means and said electrically operable bistable luminescent switching means being connected in parallel, and means for applying pulses to said control electrode, whereby a change of state of said bistable luminescent switching means is synchronized with said pulses.

References Cited by the Examiner

UNITED STATES PATENTS

| | | | |
|---|---|---|---|
| 2,898,556 | 8/1959 | Matarese | 331—107 |
| 2,975,290 | 3/1961 | Spitzer | 331—107 |
| 3,034,011 | 5/1962 | Nisbet et al. | 250—213 |
| 3,056,031 | 9/1962 | McNaney | 331—107 |
| 3,107,301 | 10/1963 | Willard | 331—145 |
| 3,110,813 | 11/1963 | Sack | 307—88.5 |

OTHER REFERENCES

Haining: RCA Technical Note, 390, 6/1960.

RALPH G. NILSON, *Primary Examiner.*

JOHN KOMINSKI, *Examiner.*

J. D. WALL, *Assistant Examiner.*